No. 840,369.  
PATENTED JAN. 1, 1907.  
G. W. PRINGLE.  
AUTOMATIC LATHE.  
APPLICATION FILED AUG. 26, 1901.

Witnesses:  
Harry C. White  
Ray White

Inventor:  
George W. Pringle.  
By Charles W. Hills,  
Attorney

No. 840,369. PATENTED JAN. 1, 1907.
G. W. PRINGLE.
AUTOMATIC LATHE.
APPLICATION FILED AUG. 26, 1901.

No. 840,369. PATENTED JAN. 1, 1907.
G. W. PRINGLE.
AUTOMATIC LATHE.
APPLICATION FILED AUG. 26, 1901.

No. 840,369. PATENTED JAN. 1, 1907.
G. W. PRINGLE.
AUTOMATIC LATHE.
APPLICATION FILED AUG. 26, 1901.

No. 840,369. PATENTED JAN. 1, 1907.
G. W. PRINGLE.
AUTOMATIC LATHE.
APPLICATION FILED AUG. 26, 1901.

No. 840,369. PATENTED JAN. 1, 1907.
G. W. PRINGLE.
AUTOMATIC LATHE.
APPLICATION FILED AUG. 26, 1901.

No. 840,369. PATENTED JAN. 1, 1907.
G. W. PRINGLE.
AUTOMATIC LATHE.
APPLICATION FILED AUG. 26, 1901.

No. 840,369. PATENTED JAN. 1, 1907.
G. W. PRINGLE.
AUTOMATIC LATHE.
APPLICATION FILED AUG. 26, 1901.

UNITED STATES PATENT OFFICE.

GEORGE W. PRINGLE, OF CHICAGO, ILLINOIS, ASSIGNOR TO E. J. NOBLETT, OF CHICAGO, ILLINOIS.

AUTOMATIC LATHE.

No. 840,369.	Specification of Letters Patent.	Patented Jan. 1, 1907.

Application filed August 26, 1901. Serial No. 73,245.

*To all whom it may concern:*

Be it known that I, GEORGE W. PRINGLE, a citizen of the United States, and a resident of Chicago, in the county of Cook and State of Illinois, have invented certain new and useful Improvements in Automatic Lathes; and I do hereby declare that the following is a full, clear, and exact description thereof, reference being had to the accompanying drawings, and to the letters of reference marked thereon, which form a part of this specification.

This invention relates to improvements in automatic lathes, and more particularly an automatic lathe designed for shaping or turning articles of wood or other material and providing screw-threads thereon.

As shown, the machine is adapted to turn and thread electrical insulator-pins, such as used in telegraph construction or the like. The invention, however, is obviously adaptable to many other uses.

The invention embraces many novel features of construction and consists of the matters hereinafter described, and more fully pointed out and defined in the appended claims.

In the drawings, Fig. 22ª is a similar view taken in a different position.

Figure 1:
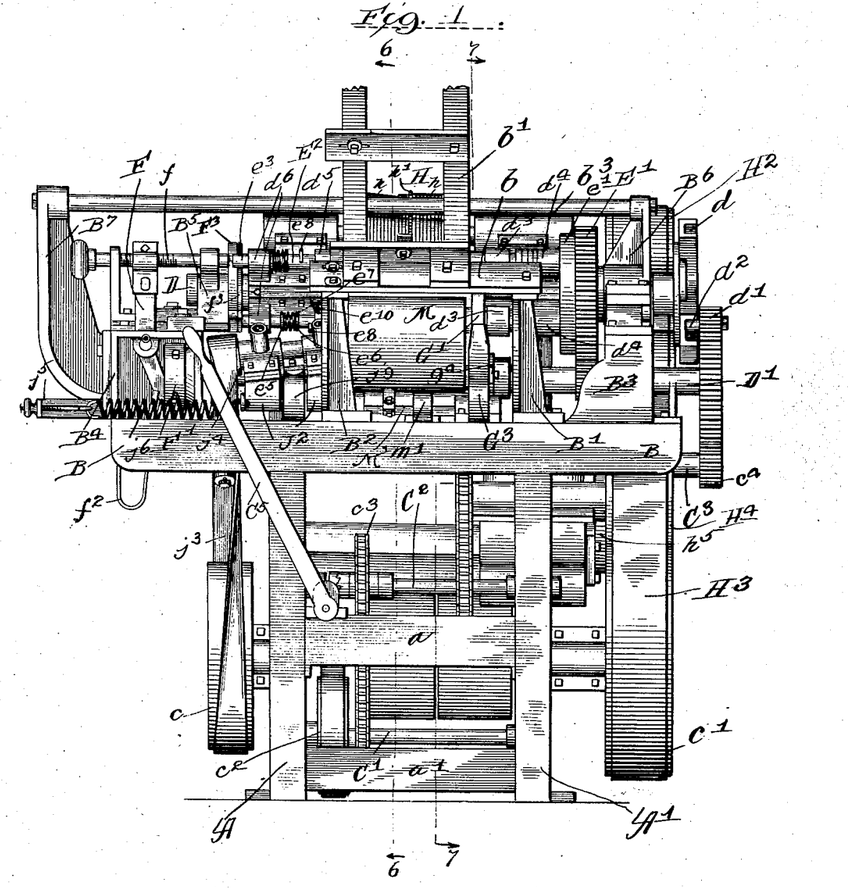
Figure 1 is a front elevation of a device embodying my invention.
Figure 2:
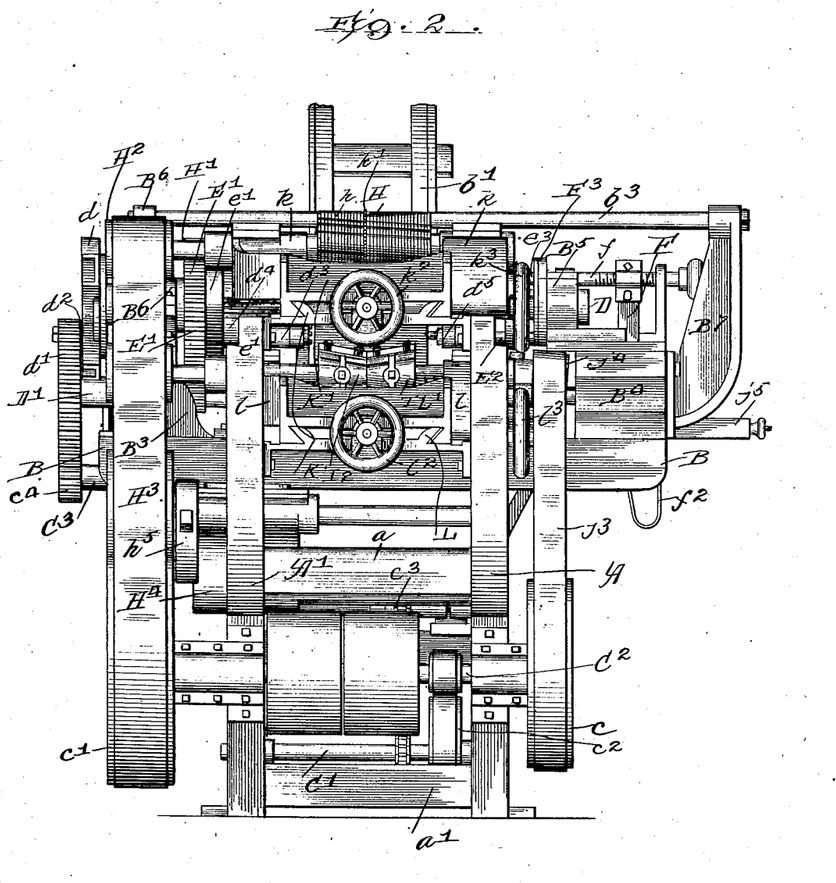
Fig. 2 is a rear elevation of the same.

As shown in said drawings, A and A' indicate the two end members of a frame, which may be constructed of cast metal or any desired material. Said end members are relatively low on the front side thereof and extending upwardly on the rear side and are connected to each other by transverse frame members *a a a' a'*, rigidly secured thereto by bolting or like means. A table B, also of cast metal, as shown, is rigidly secured on top of the lower or front portion of said end members and extends over the same at each end, as indicated in Fig. 1. On said table or bed B is supported the cutting and operating mechanism hereinafter described.

C indicates a main driving-shaft journaled horizontally on the rear end of the frame and provided with tight and loose pulleys in a familiar manner and also with the pulleys $c\ c'$, secured, respectively, on the ends thereof and adapted to drive the mechanism hereinafter described.

Figures 3, 41:
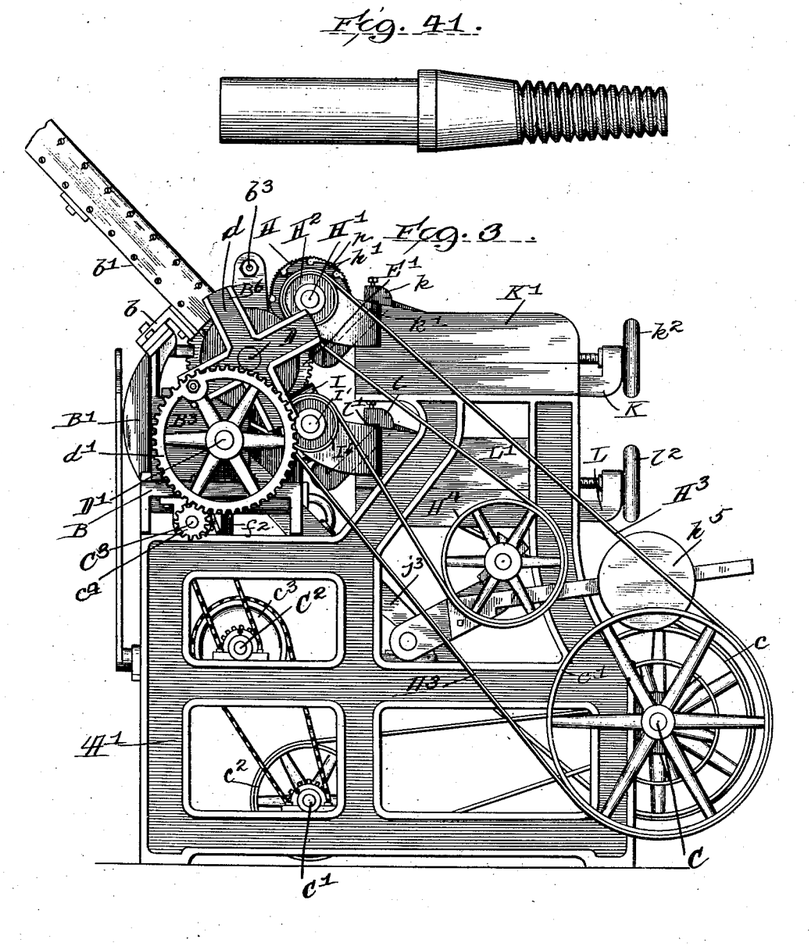
Fig. 3 is an elevation of the driving end of the machine.
Fig. 41 is a side elevation of a finished pin such as the machine is adapted to form.
Figure 4:
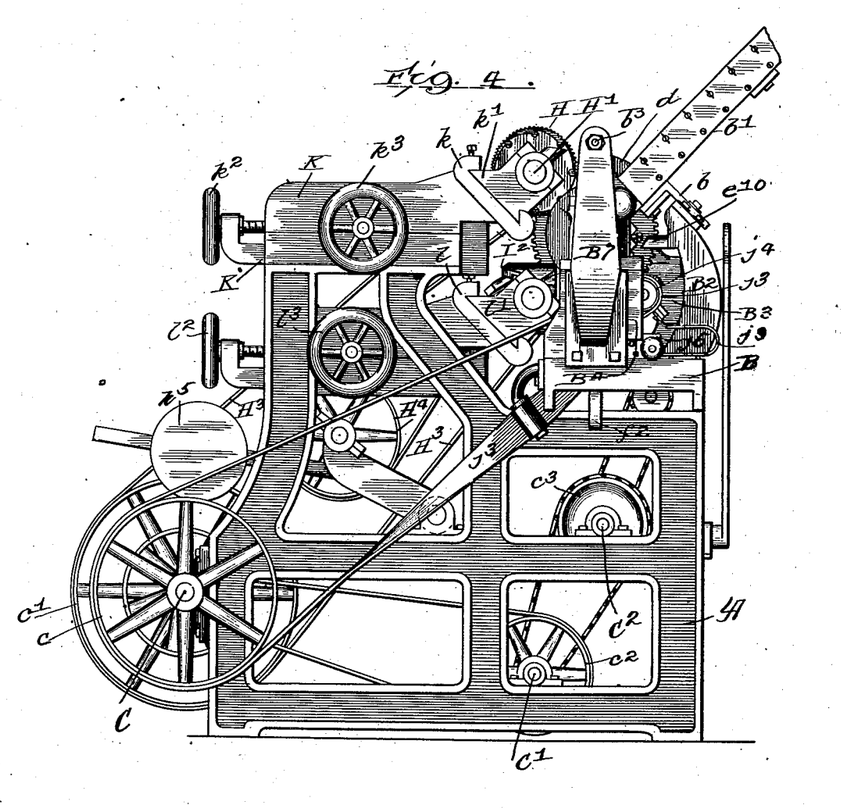
Fig. 4 is an elevation of the opposite end of the machine.
Figure 5:
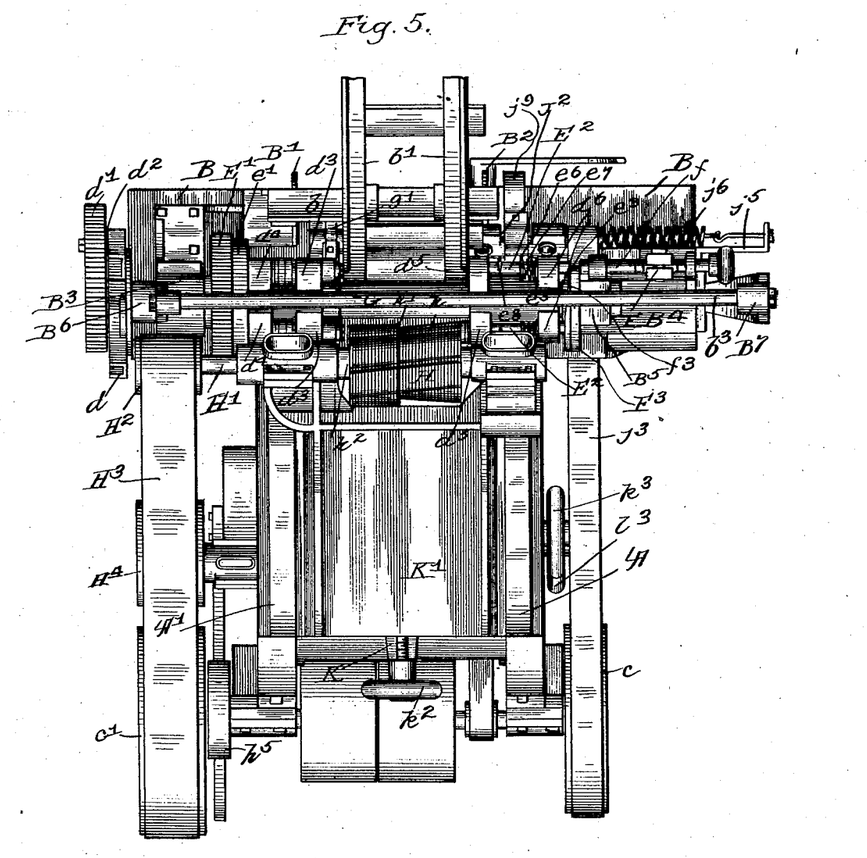
Fig. 5 is a top plan view of the same.
Figure 10:
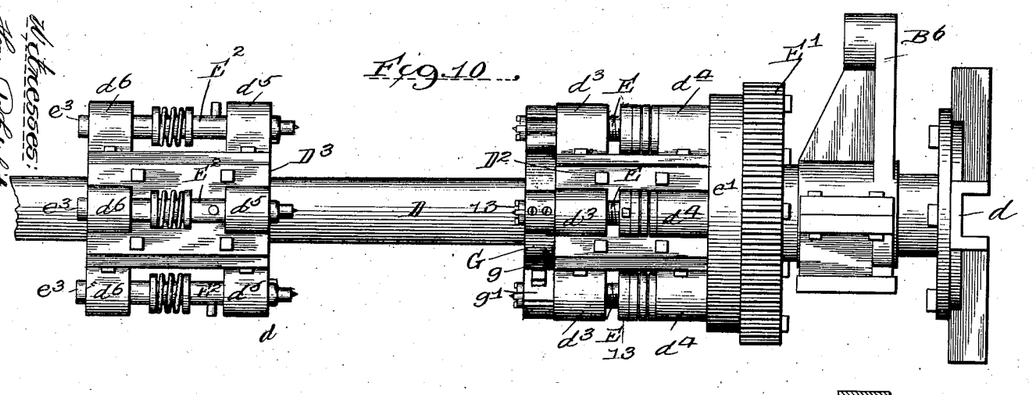
Fig. 10 is a fragmentary side elevation of the main arbor and chucks.
Figure 11:
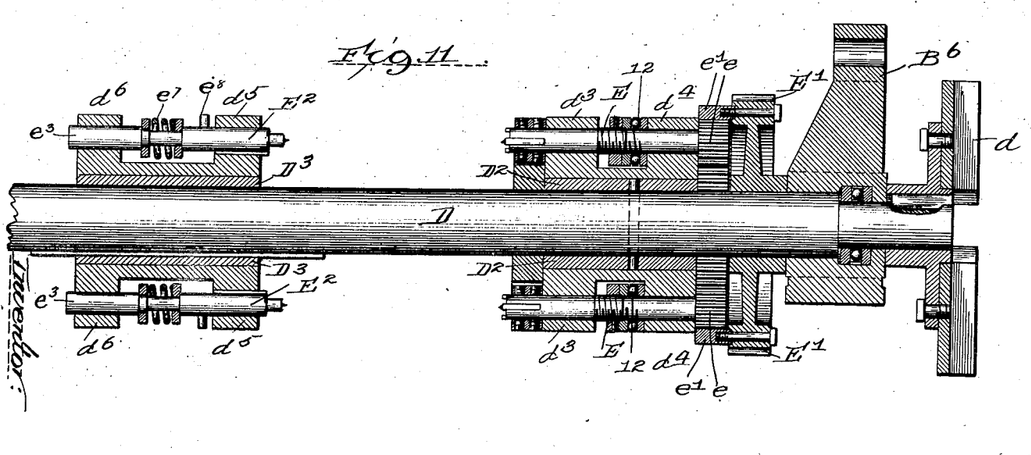
Fig. 11 is a longitudinal section of the same, showing the arbor in elevation.

Rigidly secured on the top of the table or bed B, on the front side thereof, are the standards B' and $B^2$, located, respectively, on each side of the center and, as shown, curved inwardly and secured together at their upper ends by means of the bar $b$, rigidly bolted thereto and on which is rigidly secured the feed-chute $b'$, adapted to receive blanks and to deliver the same one by one to the operating means. Rigidly secured on each end of said bed are the upright members $B^3$ and $B^4$, and rigidly bolted on said upright member $B^3$ is the upright $B^5$. An upwardly-extending arm $B^7$ is bolted at the other end of said frame to the member $B^4$. A stay-rod $b^3$ is rigidly secured to the top of each. Journaled on ball-bearings or other means affording antifriction-bearings in the standards $B^5$ and $B^6$ is the arbor D. Said arbor is provided on its end adjacent to the frame member A' with a cam $d$ in the form of a cross rigidly secured thereto, as indicated in Figs. 10 and 11. Journaled parallel with the arbor D is the shaft D', which is provided on its outer end adjacent to said cam $d$ with a gear-wheel $d'$, provided on its inner face with a roller $d^2$, adapted to engage in said cross, as indicated in Figs. 1 and 3, thereby giving the arbor an intermittent motion—that is to say, causing said arbor D to turn one-quarter of a revolution with each complete revolution of said gear $d'$. Said shaft D' and gear $d'$ are driven from the main shaft C by means of a shaft C', journaled parallel therewith and having a pulley $c^2$ thereon adapted to receive the belt from said main shaft. A sprocket-wheel is secured on the shaft C', and a chain leads therefrom over a sprocket-wheel $c^3$ on a shaft $C^2$, located above the same and parallel therewith. A sprocket-chain leads around a second sprocket-wheel thereon and around a sprocket-wheel on the shaft $C^3$, at the outer end of which is secured a pinion $c^4$, which meshes with the gear $d'$. The drive of the arbor is comparatively slow, the speed of the drive being successively reduced on each of said shafts by driving from a smaller to a larger pulley on successive shafts. A shifting lever $C^5$, pivoted on the frame member $a$, actuates a clutch member on the shaft $C^2$ into engagement with a complemental clutch member secured on the sprocket-wheel $c^3$, thereby enabling the operator to control the operation of the arbor.

Rigidly secured on the arbor D, on each side of the center of the same, are the sleeves $D^2$ and $D^3$, which are non-rotatively secured thereon by means of a key and a feather, respectively, as shown. Said sleeves are provided on diametrically opposite sides thereof with bearing members rigidly bolted thereto, each provided with two bearings parallel with the arbor D, those secured on the sleeve $D^2$ being indicated by $d^3\ d^4$. Those on the sleeve $D^3$ are indicated by $d^5 d^6$. Journaled in said bearings $d^3\ d^4$ are the rotative chucks E, provided at their inner ends with a centering point and dogs adapted to engage the ends of the blanks to be operated upon and at their outer ends with the pinions $e$, rigidly secured thereon. E' indicates a gear-wheel rotative on the arbor D and having rigidly bolted on the side adjacent to the pinions $e$ and in position to mesh therewith an internally-geared rim $e'$, as shown in Fig. 11. The shaft D' is provided with a pinion located in position to mesh with the gear E' on the arbor D.

Figures 12, 13, 14, 15, 16, 17:
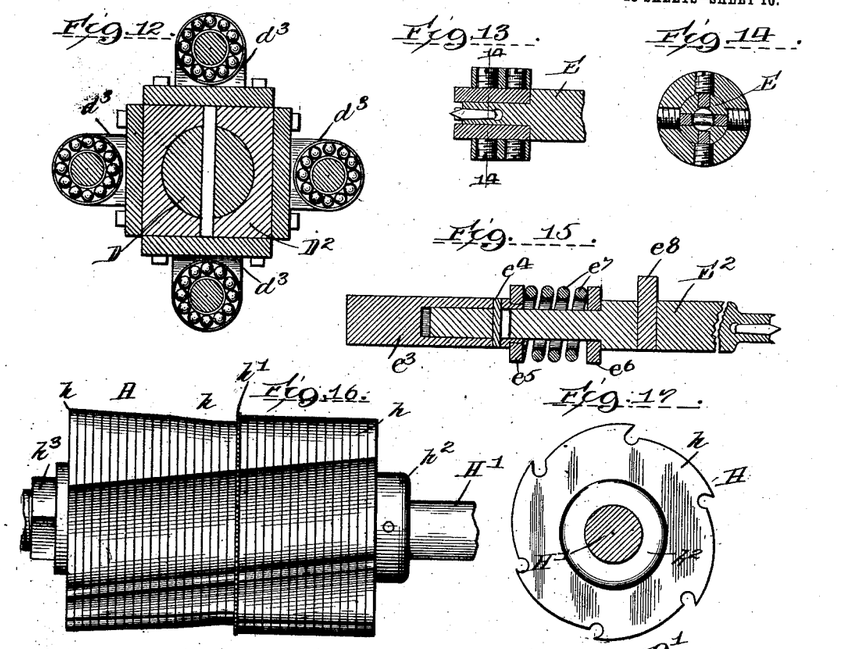
Fig. 12 is a section taken on line 12 12 of Fig. 11.
Fig. 13 is a section taken on line 13 13 of Fig. 10.
Fig. 14 is a section taken on line 14 14 of Fig. 13.
Fig. 15 is a longitudinal section of one of the chucks.
Fig. 16 is an enlarged side elevation of the roughing-tool.
Fig. 17 is an end elevation of the same.
Figures 18, 19, 21:
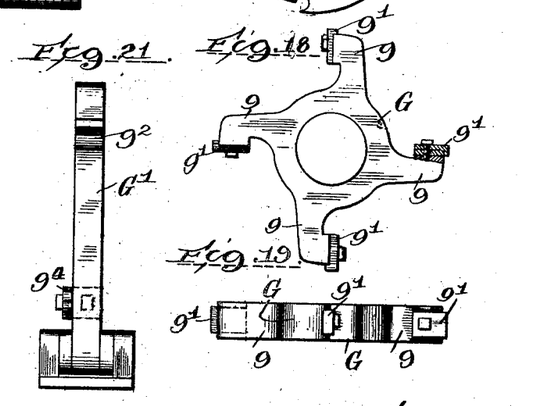
Fig. 18 is a side elevation of the revolving dog which acts to lock the arbor during the operation of the cutting means.
Fig. 19 is a plan view of the same.
Fig. 21 is a rear elevation of the same.
Figure 20:
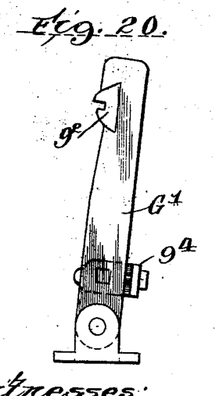
Fig. 20 is a side elevation of the locking-lever for the said dog.

The sleeve $D^3$ is located in close proximity to the standard $B^5$ and is provided with bearings $d^5\ d^6$, corresponding with the bearings $d^3$ and $d^4$ on the sleeve $D^2$ and in which the spindles $E^2$ have their bearings. Said spindles are also provided at their ends adjacent to the chucks E with center points adapted to engage the opposite end of the blank from that engaged by the chucks E. Said spindles are, as shown, longitudinally extensible, being reduced at the rear ends thereof, as indicated in Fig. 15, and engaged in the cylindric longitudinally-socketed shafts $e^3$. A pin $e^4$ passes through said socketed shaft and the end of the spindle $E^2$, which is slotted to receive the same. Washers $e^5\ e^6$ are secured on said socketed shaft $e^3$ and said spindle $E^2$, and a strong coiled spring $e^7$ is engaged between the same, acting normally to hold the spindle $E^2$ extended with respect to said socketed shaft. A pin $e^8$ acts to limit the forward movement of the spindle through the bearing $d^6$.

Figure 7:
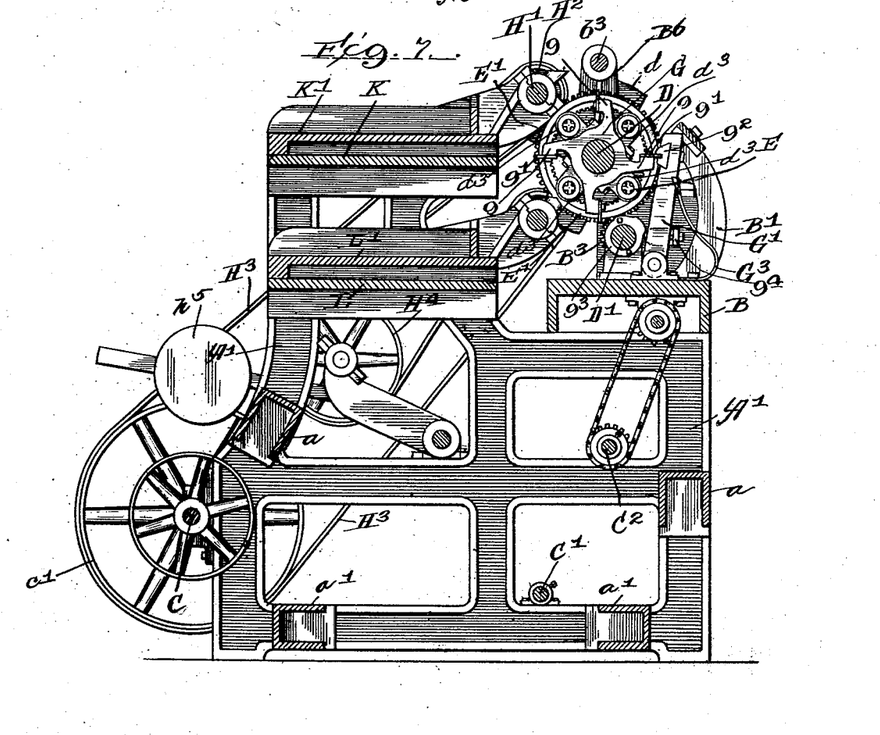
Fig. 7 is a section taken on line 7 7 of Fig. 1.
Figure 8:
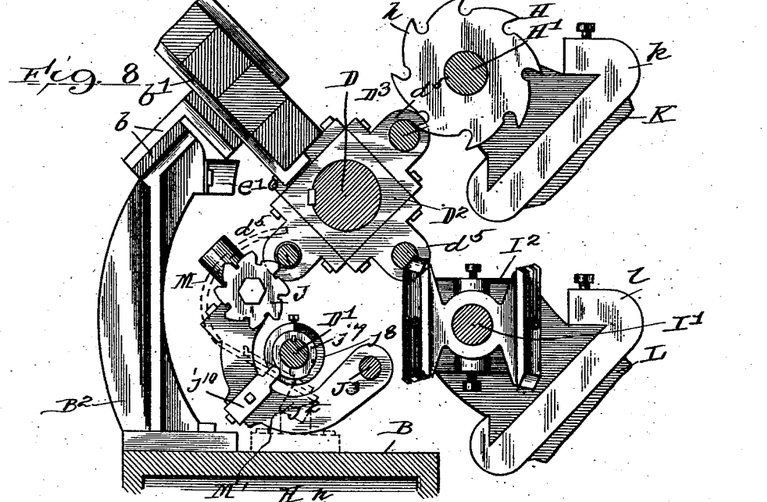
Fig. 8 is an enlarged detail illustrating the cutting means.
Figure 28:
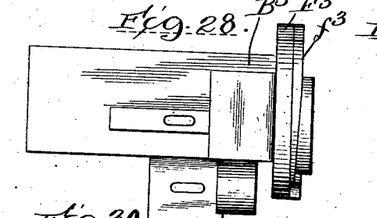
Fig. 28 is a detail of the cam which actuates the chucks into engagement with the blanks to be operated upon.
Figure 29:
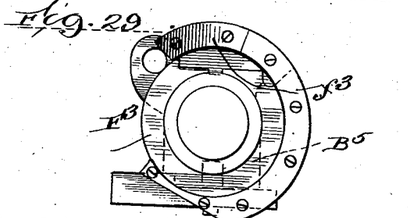
Fig. 29 is an end elevation of the same.
Figures 30, 31, 32, 33, 34, 35:
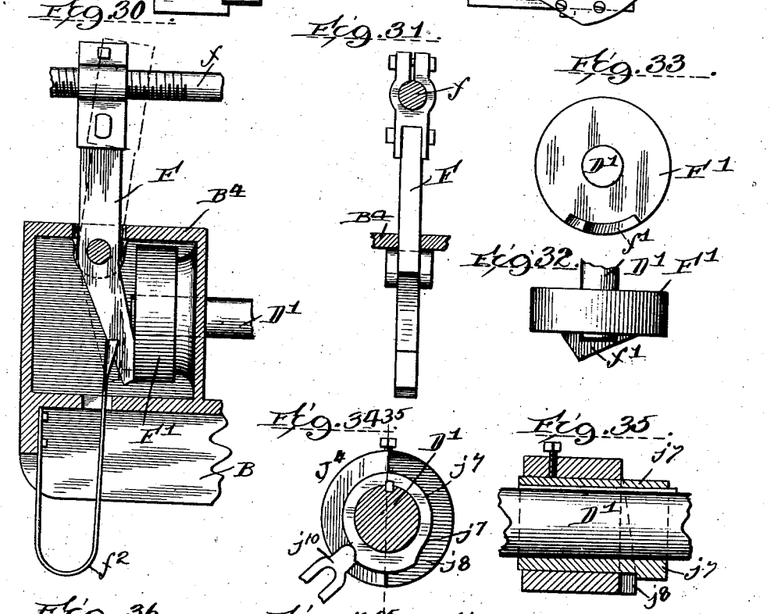
Fig. 30 is an enlarged detail of means for forcing said chucks into positive engagement with the blanks.
Fig. 31 is a side elevation of the same.
Fig. 32 is a side elevation of the cam-wheel illustrated in Fig. 30.
Fig. 33 is a face view of the same.
Fig. 34 is an enlarged face view of the cam which acts to throw the threader into and out of engagement.
Fig. 35 is a section taken on line 35 35 of Fig. 34.

The chute $b'$ is so located with respect to the arbor that as the arbor revolves the chucks and spindles preferably pass on each side of the chute and engage to lift therefrom a block held therein, as shown in Fig. 8. The spindles $E^2$ are free to move longitudinally inward into position to engage the block against the center of the corresponding chuck E. Means are provided for forcing the same inwardly, comprising an arm F, pivoted on the upright member $B^4$ and extending upwardly therefrom and provided at its upper end with an adjustable thrust-shaft $f$, the end of which extends into position to engage the successive rear ends of the socketed shafts $e^3$ when the spindles are in position to engage a block in said chute. The lower end of said arm extends below its pivot and inwardly in position to engage a cam-wheel F' secured on the shaft D', having a projecting cam-surface $f'$ on its face. A strong spring $f^2$ acts to hold the lower end of the arm F at all times in engagement with the face of said cam wheel or disk. Fig. 30 illustrates the movement of said arm. On the inner end of the standard B⁵ is the circular fixed cam-disk F³, concentric with the arbor, as shown in Figs. 1, 28, and 29. The face of said cam-disk is inclined or beveled inwardly, as shown in Figs. 28 and 29, from the point where the ends of the socketed shafts e³ first approach the same and terminates at the point where said socketed shafts leave the face thereof. The operation of this part of my invention is as follows: During the revolution of the arbor the protruding ends of the socketed shafts e³ come in alinement with the thrust-rod f, secured on the arm F, at the time when the cam f' on the cam-wheel F² is in position to actuate said arm. The arm is oscillated to the position shown in dotted lines in Fig. 30, thereby bringing the end of the thrust-rod f into contact successively with the ends of the socketed shafts e³, forcing the spindles inwardly into engagement in the center of the lowermost blank or block held in the chute with sufficient force to engage the same against the center of the chuck E opposite. At the moment the thrust-rod f has accomplished this, the socketed shaft e³ sweeps out of the path of the same into contact with the beveled face f³ of the cam F³. The shape and disposition of said cam-disk is such that as the block is lifted thereby the spindle E² is forced firmly inward, thereby bedding the engaging ends of the chuck E and spindle E² firmly in the ends of the blank and causing the blank to revolve therewith. The spring e⁷ acts to permit the spindles to readily adjust themselves to the varying hardness of the material operated upon. The thrust-rod f after having accomplished its office is retracted under the influence of its spring f² into position to engage the next succeeding spindle in the manner heretofore described. The arbor, as before described, revolves intermittently, making a slight pause at each quarter of each revolution. The chucks E, however, with the blanks engaged thereby, revolve continuously and uniformly by means of the shaft D'. For the purpose of stopping said arbor exactly at each quarter-turn in operative relation to the cutting mechanism a dog G is rigidly secured on the arbor D, as shown, in front of the sleeve D². Said dog is provided with four arms g, arranged at right angles with each other and which project upwardly between the chucks, as shown in Fig. 7. At the extremity of each arm is a radial projection or detent g', which may be integral with the arm, but which preferably is a piece of chilled or hardened metal, which is rigidly bolted thereon. Pivotally secured on the bed B is the upwardly-extending arm G', the upper end of which is provided with a recess adjacent to the dog G, in which is secured an outwardly-projecting block g², downwardly inclined on its front surface and provided with a horizontal slot adapted to receive the projection g' on said dog. A spring G³, herein shown as a leaf-spring, acts to press the upper end of said arm inwardly into engaging position. On the shaft D' is rigidly secured a cam g³, adapted to actuate said arm G', on which is secured an adjustable contact-piece g⁴ in position to be engaged by said cam. Said contact-piece comprises, as shown, a plate slidably secured on said arm by a bolt, whereby the same may be adjusted transversely of the arm to secure any desired throw of the upper end of said arm to engage and release the detent g'.

Figure 6:
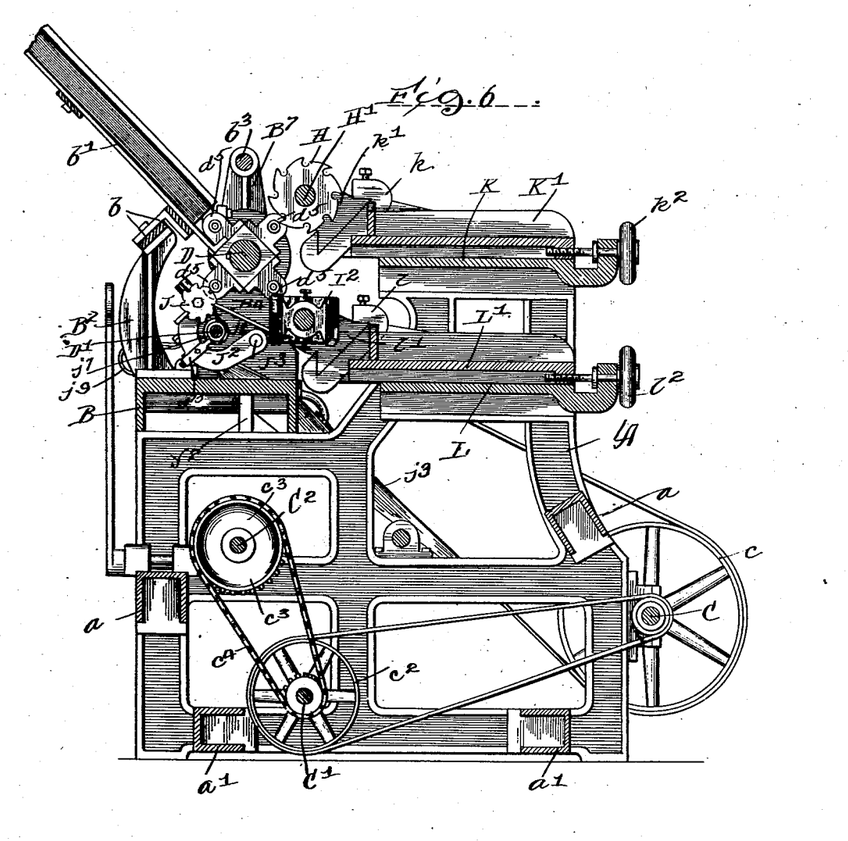
Fig. 6 is a section taken on line 6 6 of Fig. 1.

Referring now to the means for shaping the blank, H indicates what I shall term the "roughing" means. I indicates a trimming or smoothing head, and J indicates the threaders. Said means, as shown, are located in position to engage the blank at successive quarters of the revolution of the arbor, or, in other words, at points where the arbor is at rest momentarily, and it will be seen by referring to Fig. 8 that the point for receiving the blank for roughing the same, for smoothing the same, and for cutting the threads thereon are each located approximately ninety degrees apart. The roughing means consist of a plurality of circular saws h of such size and so arranged in close contact with each other, as indicated in Fig. 16, that the outer surface thereof corresponds with the longitudinal contour of the pin or article to be turned. Said saws are arranged to roughly form the cylindric head or end of the pin and to shape the opposite end thereof to receive the threads. As shown, said saws are each provided with a plurality of teeth and so arranged upon their arbor or mandrel that the teeth thereof coincide and extend in an oblique line across the face thereof, thereby presenting an oblique cutting edge to the grain of the wood. A saw h' of somewhat greater diameter than the saws h is secured on the same arbor and designed to provide an offset or shoulder on the pin, as indicated in Fig. 41. Said saws may be secured upon their arbor by any desired means. As shown, however, a nut or collar h² is rigidly secured on the arbor and against which the saws or cutters are clamped by means of a nut h³, which engages on the opposite end of said arbor. The arbor H', with its cutters, is journaled above and at one side of the main arbor D on the side opposite from the feed-chute which delivers the blanks thereto and in such position that the roughing-head H revolves oppositely from the rotation of the blank. Means are provided for adjustably supporting said arbor H' and for adjusting the same independently of the other operative parts of the machine, comprising horizontal ways K, integral with the machine-frame, as shown in Fig. 6, adapted to slidably support the slide-bar K', at the inner end of which is an integral clamp $k$, provided with a dovetailed recess, as indicated in Fig. 6, and in which engages the bearing $k'$ for said shaft. The hand-wheel $k^2$, revolubly supported on the ways K, engages in said slide-bar and acts by the rotation thereof to move the same transversely of the machine, or, in other words, adjust the roughing-head H with respect to the blank to be operated upon. $k^3$ indicates a hand-wheel on which is secured a threaded shaft adapted to engage and lock said slide-bar with respect to its ways when in its adjusted position in a familiar manner. The arbor H' is provided at its outer end with a pulley $H^2$, adapted to receive the driving-belt $H^3$.

Figures 22, 22A, 23, 24:
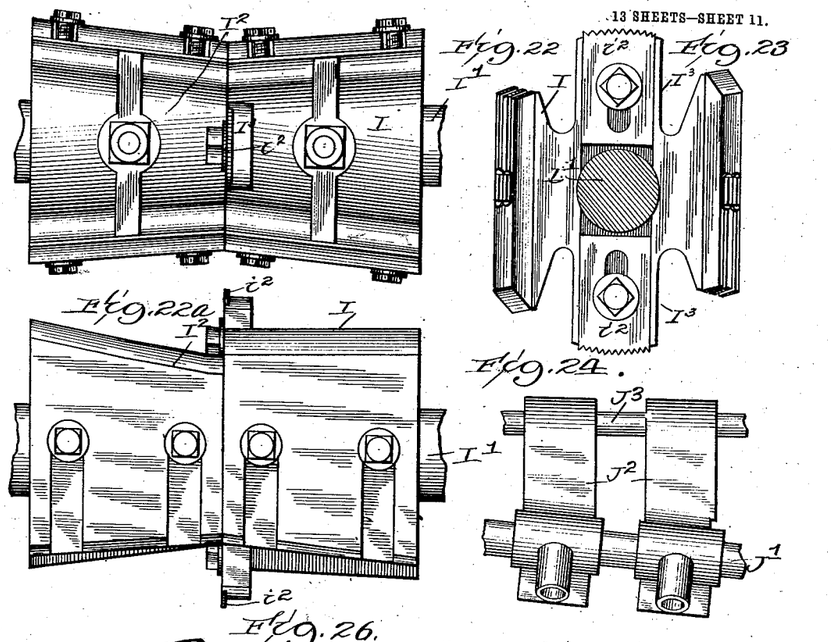
Fig. 22 is a side elevation of the finishing or smoothing tool.
Fig. 23 is an end elevation of the same.
Fig. 24 is a plan view of the hangers or brackets in which the threader-shaft is journaled.

The smoothing or trimming head consists of a plurality of cutter-heads I $I^2$, rigidly secured upon the arbor I', located beneath the arbor H' of the roughing-head and in position to engage the blank, as shown in Figs. 6 and 8, when diametrically opposite the receiving-chute. The cutter-head I consists of a casting or forging provided with oppositely-directed faces, on which knives are adjustably secured by means of stud-bolts, as indicated in Fig. 23. Said knives are set slightly oblique to the arbor I', thereby engaging the grain of the wood at the most advantageous angle for cutting the same smoothly. Obviously the conformation of cutting edges will depend upon the form of the article to be turned. In this instance the knives being designed to turn the spindle of an insulating-pin the edges thereof will at all times be at equal distance from the axis, thereby causing the same when rotating to have a cylindric appearance. Said cutter-head is secured on the arbor I' by means of set-screws, as indicated in Figs. 22 and $22^a$, which extend therethrough and engage the arbor. The cutter $I^2$ is similar in all respects to the cutter I, with the exception that the edges of its knives are inclined, as shown in Fig. 22, to form the taper of the pin. For the purpose of forming the shoulder at the inner end of the cylindric portion of the same blades $i^2$ are secured between said cutter-heads I and $I^2$ on diametrically opposite sides of the arbor, and the outer edges thereof are provided with serrations or saw-teeth. Said blades are adapted to be adjusted radially of the arbor by means of set-screws, which extend through elongated longitudinal slots in said blades and engage in the plates $I^3$ $I^3$, integral with the cutter I.

Means are provided for adjusting the trimming or smoothing head to its work similar to the means for adjusting the roughing-head. In this instance the ways L are located beneath the ways K, and a slide-bar L' is supported thereon and adapted to move transversely of the machine by a screw-shaft provided with a hand-wheel $l^2$, which is rotatably secured on the ways and the screw-threaded end of which engages the slide-bar. Clamps $l$ are secured on the inner end of the slide-bar, and the bearing or box $l'$ of the arbor is removably secured therein by means of set-screws, as shown in Figs. 6 and 8. A hand-wheel provided with a screw-shaft $l^3$ operates to lock the slide-bar in its adjusted position, as before described for the hand-wheel $k^3$ and its shaft. A pulley $I^4$ is secured on the outer end of the arbor beneath the pulley $H^2$ of the arbor H', and the belt $H^3$, which actuates the roughing-head, passes around said pulleys, as shown in Fig. 3, and around a tension-pulley or tightener $H^4$, as shown in Fig. 3. Said tightener may be any familiar form of belt-tightener and in this instance is provided with a weight $h^5$ to produce the desired strain upon the belt. The roughing and smoothing cutter-heads are thus caused to rotate in the same direction— that is to say, in a direction opposite to the rotation of the blank.

Figure 9:
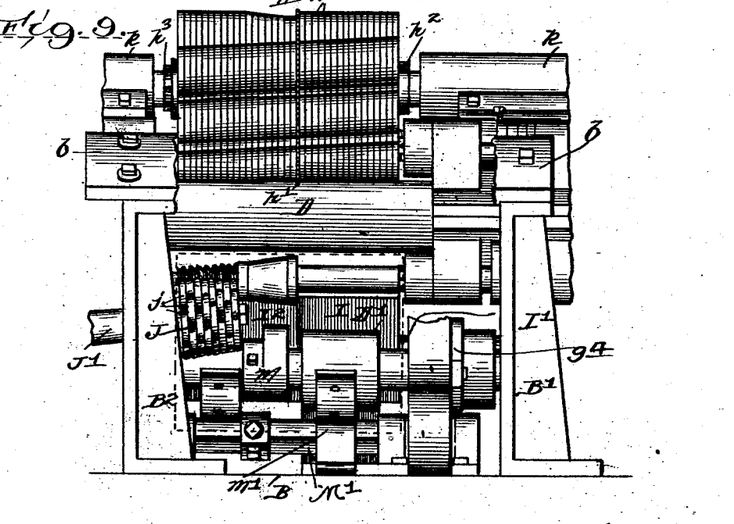
Fig. 9 is an enlarged fragmentary front elevation of the cutting means.
Figures 25, 26, 27:
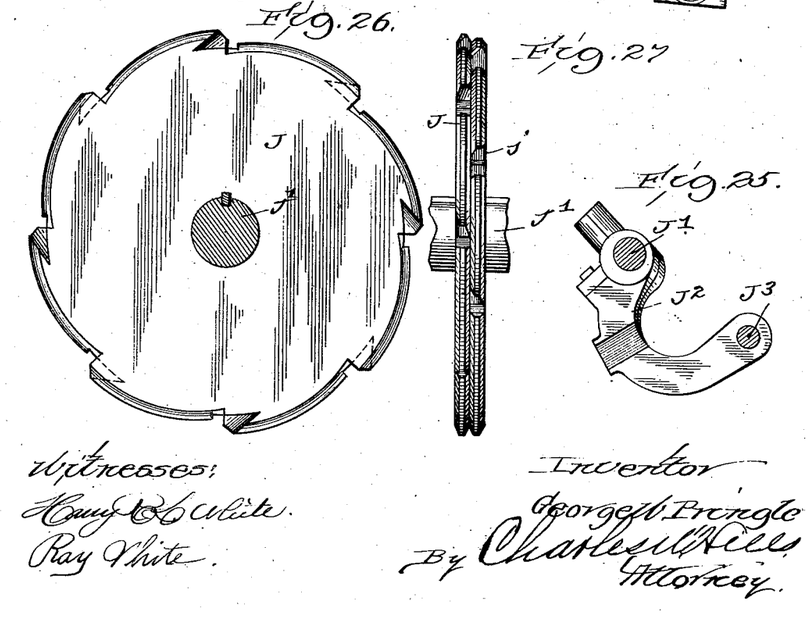
Fig. 25 is a side elevation of the same.
Fig. 26 is an enlarged view of the threader-saws, showing their shaft in section.
Fig. 27 is an edge elevation of the same.

The threading-head J is located below the arbor and diametrically opposite from the roughing-head, and consists of a plurality of threading-saws $j$, rigidly secured on the arbor J' in close contact with each other, as shown in Fig. 27, in which two of such saws are shown. The edges of said saws are tapered to conform to the shape of the thread, and teeth are provided thereon of such shape as to provide cutting edges at their periphery and at alternate edges of the plate, as indicated in Figs. 26 and 27. Means are provided for moving said threader-head into and out of engagement with the blank and longitudinally during the cutting operation thereof, as follows: The arbor J' is journaled adjacent to the threader-head on the curved bracket $J^2$, pivoted on the horizontal shaft $J^3$, rigidly secured at one end on the upright member $B^4$. Said brackets are adapted to slide longitudinally of the shaft $J^3$. The end of said shaft or arbor J' beyond said hangers or brackets $J^2$, is provided with the pulley $j^4$, adapted to receive the belt $j^3$ from the driving-pulley $c$, as shown in Fig. 1. Said hangers are of such form as to permit the shaft to lie with the driving end thereof inclined downward, as shown in Figs. 9 and 24, thereby setting the cutters of the threading-head at an angle with the axis of revolution of the blank equal to the lead of the desired thread on the finished pin, as shown in Fig. 9. A strong spring $j^6$, herein shown as a spiral spring, is secured at one end on one of said hangers and at the other end is secured on a bracket-arm $j^5$ at the end of the machine by means of a bolt which engages in said spring and which passes through said bracket-arm $j^5$ and is engaged by a thumb-nut, whereby tension of the spring may be adjusted. Said spring acts normally to hold the shaft and threading-head retracted longitudinally, as indicated in Fig. 9. Means are provided for moving said shaft against the tension of said spring a distance slightly greater than the distance between adjacent threads for the purpose of completing said threads. For this purpose a compound cam $J^4$ is rigidly secured on the shaft $D'$ and provided with a radial cam-surface $j^7$ and a cam-surface $j^8$, having its face directed longitudinally of the shaft and in the direction of the draft of said spring. A traveler or contact-piece $j^{10}$ is rigidly secured by bolting or like means on the bracket-arm $J^2$ adjacent to the threading-head, in position to be engaged by both of said cam-surfaces, as indicated in Figs. 8 and 34. A spring $j^9$, herein shown as a leaf-spring, engages beneath said bracket-arm and acts to hold said threading-head J upwardly in position to engage the blank. Said cam-disks are so adjusted and proportioned as to permit the threading-head to remain in engagement with the blank or pin during but little more than one revolution of said pin. The angle of inclination of the axis of said threading-head to the axis of said pin provides the desired lead of thread, and at the moment the said thread-cutters come into engagement with said pin the longitudinally-directed cam-face engages the traveler $j^{10}$ and forces the bracket-arm $J^2$, with the shaft $J'$ and cutter-head, longitudinally of the pin a distance approximately equal to the with between two adjacent threads. When the pin has completed approximately one revolution, the threading-head has traveled said distance longitudinally, and the radial cam projection engages said traveler and forces the bracket-arm downwardly, thereby throwing said threading-head out of engagement with the pin. For the purpose of admitting ready adjustment of the parts of said compound cam $J^4$ the same is constructed, preferably, in the form of two sleeves, of which the inner is provided with the radial cam-surface $j^7$ and adjustably secured on the shaft and the outer with the longitudinal cam-surface $j^8$. Said outer sleeve is secured upon the inner by means of a set-screw or any desired means to hold the same in its adjusted position. When the threading-head is thrown out of engagement with the pin, the arbor D again makes one-fourth of the revolution into position to receive another blank, and just before the completion of said movement the pin is released and discharged from the machine. For the purpose of disengaging the pin a cam projection $e^{10}$ is rigidly secured on the inner side near the top of the standard $B^2$ in position to engage the pin $e^8$ on the part $E^2$ and acting to force the same rearwardly out of engagement with the end of the finished pin just as the pin carried by said arbor approaches the under side of said feed-chute. The rotation of the pin when released from its carrying means acts to throw the same forwardly out of the machine. The arbor continues its revolution until in position to engage another blank from the feed-chute, when it is again arrested by the dog and another blank secured therein, as before described.

Figure 36:
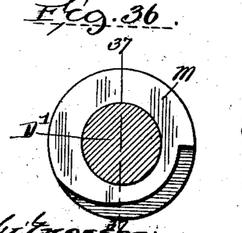
Fig. 36 is a face view of the cam operating the fender.
Figures 37, 38:
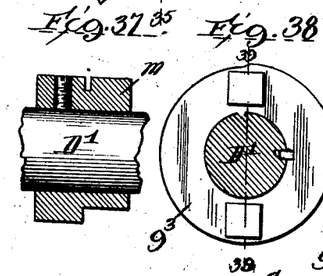
Fig. 37 is a section taken on line 37 37 of Fig. 36.
Fig. 38 is a front view of the cam that operates the locking-arm.
Figure 39:
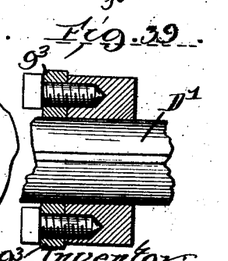
Fig. 39 is a section taken on line 39 39 of Fig. 38.
Figure 40:
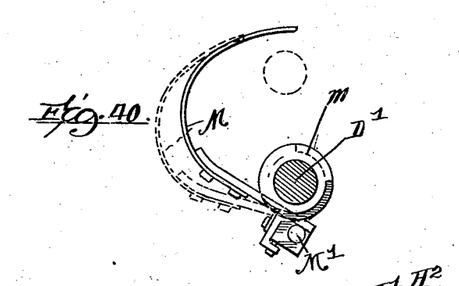
Fig. 40 is a detail of the fender and its operating-cam, showing said fender in its two positions.
Figure 42:
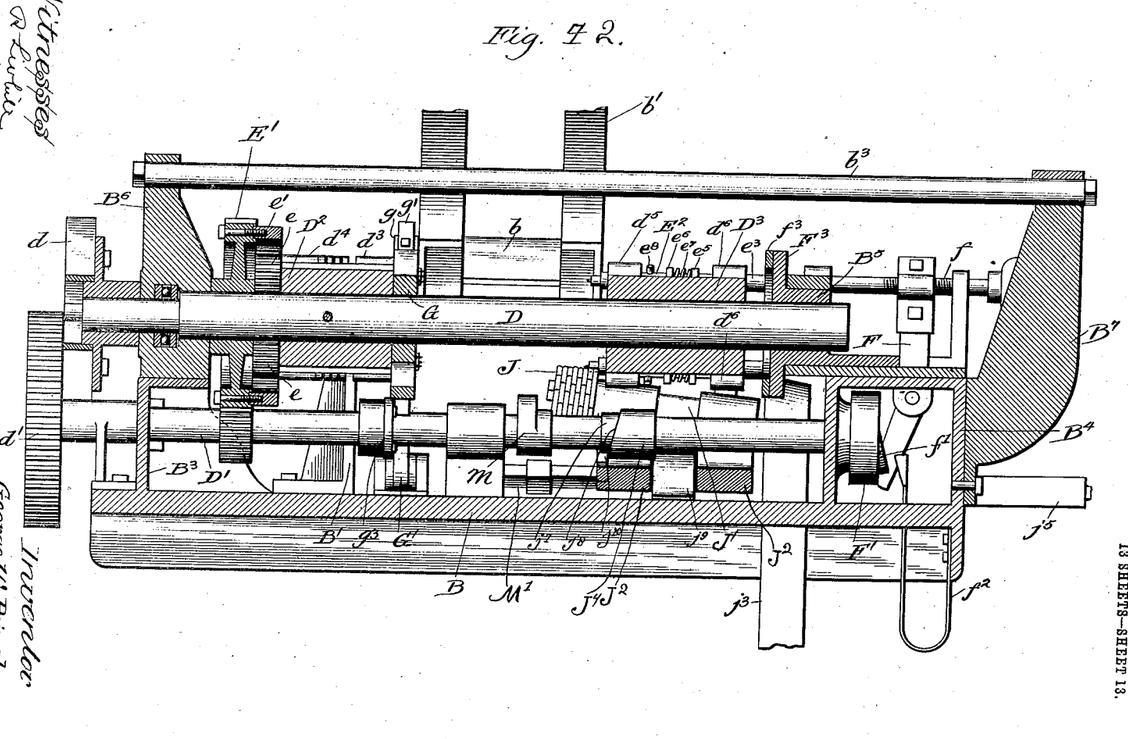
Fig. 42 is a fragmentary longitudinal vertical section of the machine, taken through the standards $B^6$ and $B^7$ and with parts removed.

For the purpose of protecting the operator should a pin be thrown by one of the cutter-heads a horizontal pivot-shaft $M'$ is secured on the bed B between the standards $B'$ and $B^2$, and a curved fender M is rigidly secured thereon by bolting or like means. Said fender is of a length sufficient to project beyond each end of the pin or blank carried by the arbor and curves upwardly and inwardly, as indicated in full lines in Fig. 40, into close proximity with and beneath said chute. A cam $m$, details of which are shown in Figs. 36 and 37, is rigidly secured on the shaft $D'$, as indicated in Fig. 40, and engages a part secured on said fender and acts to force the same rearwardly against the action of the spring $m'$ to the position shown in dotted lines at the moment the pin is released, thereby permitting the pin, which is thrown upwardly and forwardly as it leaves the machine, to pass over the top of the same, when the fender immediately swings inwardly to the position shown in full lines.

The operation is as follows: The blanks of a desired dimension are placed in the chute, as shown in Fig. 8, and the machine started in operation. When the centers are in alinement opposite the lowermost blank, the thrust-rod moves longitudinally and engages the inner end of the socketed spindle $e^3$ and forces the same longitudinally, thereby engaging the blank on the centers of the chucks and tail-stock spindle. The dog is now released and the arbor again revolved, carrying the spindle out of engagement with the thrust-rod and into engagement with the cam $F^3$, which acts to force the same longitudinally, thereby more firmly engaging the blank, until at the time the blank is in position to be engaged by the roughing-head the chucks and the tail center are firmly bedded therein and the blank rotates with the chuck. The arbor is now again arrested by the dog with the blank in position to be engaged by the roughing-head and the next succeeding chuck and tail center engaging another blank, when the roughing operation is completed, the dog is again released, and the arbor rotates in position for the smoothing or trimming head to engage said blank, while the succeeding blank is in position to be engaged by the roughing-head and a blank in the chute is being engaged by the chuck and tail center diametrically opposite from the smoothing-head. When the smoothing or trimming head finishes its operation, the arbor again revolves, bringing the smoothed blank, which now is finished with the exception of the thread, into position to be engaged by the thread-cutting head, which, as before stated, is set an angle with the axis of said pin corresponding with the lead of the thread. The cam which operates to move said threading-head into and out of engagement with said blank is so adjusted as to permit said threading-head to be in engagement with the pin only while said pin is making approximately one revolution, and at the moment said threading-saws engage the pin the face of the cam $j^8$ forces the threading-head longitudinally thereof a distance equal to the width between adjacent threads, so that each of the threading saws or cutters of said thread-cutting head finishes the cut started by the preceding saw. When the thread is complete, the threading-head is thrown out of engagement and the arbor again revolves to the discharging position with the completed pin still rotating. The rear end of the tail-stock spindle now passes out of engagement with the cam $F^3$, and the cam $e^{10}$ on the standard $B^2$ at the same time engages in front of the pin $e^8$ and forces the same rearwardly, thereby releasing the tail centers from the finished pin at the same moment that the cam $m$ engages the fender and forces the same outwardly in the position shown in dotted lines in Fig. 40, in which position the pin under impetus due in part to its rotation and the upward swing on the arbor passes over said fender and falls beside the machine. The fender after the pin passes over the same immediately returns to its normal position under the action of its spring. This operation is repeated as long as the blanks are supplied in the chute.

Obviously it may be desirable to manufacture pins of different lengths and sizes, and for this purpose the sleeve $D^3$ is adjustably secured on the arbor D by means of a feather, as indicated in Fig. 11, and is adapted to be secured in an adjusted position longitudinally of the shaft by means of the set-screw or set-screws indicated in Fig. 10. So, too, if it is desired to make pins of larger or smaller diameter the roughing or trimming head may be adjusted, as before described, by means of the respective slide-bars on which are secured the bearing-boxes for said heads. Obviously, too, many other articles other than insulating-pins, as herein described, may be constructed by a machine embodying my invention, and many of the details of construction may be modified without departing from the principle of my invention.

I claim as my invention—

1. In a device of the class described the combination with a plurality of chucks of a rotary cutter journaled obliquely thereto and means for moving said cutter longitudinally of the chucks.

2. In a device of the class described the combination with a rotary chuck of a shaft journaled obliquely thereto, a plurality of cutters on said shaft, means for moving the same longitudinally of the chuck and automatic means for moving the cutters to and from the chuck.

3. In a device of the class described the combination with a rotary chuck adapted to engage a blank, of an arm pivoted beneath the same, a cutter-head journaled in said arm obliquely to the chuck and means adapted to engage the arm and move the cutter longitudinally of the chuck.

4. In a device of the class described the combination with a rotary chuck of outwardly and upwardly curved arms pivoted beneath the same, a shaft journaled in said arms obliquely to the chuck, a plurality of toothed cutters rigidly engaged thereon, a cam-follower on said arm and a plurality of cams adapted to engage therewith and move the cutters longitudinally of the chuck and outwardly therefrom.

5. In a device of the class described the combination with a frame of a rotative chuck thereon, curved arms pivoted on the frame beneath said chuck, a shaft journaled thereon obliquely to the chuck, toothed cutters on said shaft provided with beveled edges, an adjustable spring carried on the frame and adapted to normally hold the cutters from movement longitudinally of the chuck, means for moving said cutters against the tension of said spring and means for throwing said cutters outwardly from the chuck.

6. In a device of the class described the combination with a frame of a chuck thereon adapted to engage a blank, a shaft beneath the chuck and parallel therewith, arms pivotally supported on said shaft and movable longitudinally thereof, an arbor journaled in said arms at an angle to the axis of the blank cutters thereon adapted to form threads in the blank, a follower on one of said arms, a shaft journaled beneath the arbor and adjustable cams adapted to engage said follower and regulate the operation of the cutters.

7. In a device of the class described the combination with a frame of an intermittently-revoluble mandrel thereon, continuously-rotating chucks on said mandrel adapted to engage blanks, an arbor pivotally supported adjacent the mandrel, at an angle to the axis of the blank a plurality of toothed thread-cutters thereon, means for moving said cutters longitudinally of the blank a distance equal to the lead of the thread during one revolution of the blank and means for throwing the cutters out of engagement therewith at the end of the revolution.

8. In a device of the class described the combination with a frame of an intermittently-revoluble arbor, a plurality of chucks thereon adapted to engage a blank, arms pivotally supported on the frame, an arbor journaled therein at an angle to the axis of the blank, a cutter-head thereon, an arm rigidly engaged on the frame, an adjustable spring engaged thereon and on the pivotally-supported arms, a cam-follower on one of said arms, a shaft journaled beneath the chucks, a longitudinally-directed adjustable cam thereon adapted to engage the cam-follower and move the cutter-head longitudinally of the blank, an adjustable, radially-directed cam on said shaft adapted to throw the cutters out of engagement with the blank and means for feeding the blanks to the chucks.

9. In a device of the class described the combination with a frame of an arbor journaled therein, a plurality of rotative chucks on said arbor adapted to engage blanks, means for throwing said chucks into and out of operative position, a pair of arms pivotally engaged beneath the arbor and extending forwardly and upwardly, longitudinally-movable cutting means thereon arranged at an angle to the axes of the blanks and a cam adapted to intermittently throw said cutting means outwardly.

10. In a device of the class described the combination with a frame of an arbor journaled thereon, means acting to intermittently rotate said arbor, a plurality of chucks carried on said arbor, adapted to receive blanks, means for continuously rotating said chucks, a pair of forwardly and upwardly curved arms pivoted on the frame beneath the chucks, a plurality of cutters thereon, means normally holding said cutters in position to engage the blanks, means for throwing said cutters out of cutting position and means for moving the cutters longitudinally of the chucks.

11. In a device of the class described the combination with a frame of an arbor journaled thereon, a cam on said arbor, means engaging said cam and intermittently rotating the arbor, a plurality of chucks rotatively engaged on said arbor, a feed-chute adapted to deliver blanks to said chucks, means for throwing the chucks into engagement with the blanks, a pair of forwardly and upwardly curved arms pivotally supported beneath the chucks, a shaft journaled therein at an angle to the axes of the chucks, cutters thereon, means for rotating said cutters, means for moving the cutters longitudinally of the chucks, means for throwing said cutters into and out of engagement with the blanks and means for discharging the blank from the chucks.

In testimony whereof I have hereunto subscribed my name in the presence of two subscribing witnesses.

GEORGE W. PRINGLE.

In presence of—
C. W. HILLS,
LOUIS J. DELSON.